United States Patent [19]

Kubo et al.

[11] 4,289,873

[45] Sep. 15, 1981

[54] PROCESS FOR PRODUCING LACTONE POLYESTERS

[75] Inventors: Masayoshi Kubo, Oi; Michio Nakanishi, Niza; Mamoru Kimura, Oi, all of Japan

[73] Assignee: Daicel Chemical Industries, Ltd., Sakai, Japan

[21] Appl. No.: 97,780

[22] Filed: Nov. 28, 1979

[30] Foreign Application Priority Data

Nov. 30, 1978 [JP] Japan ............................. 53-148211

[51] Int. Cl.³ ............................................ C08G 63/10
[52] U.S. Cl. ................................................. 528/357
[58] Field of Search ........................................ 528/357

[56] References Cited

U.S. PATENT DOCUMENTS

| | | | |
|---|---|---|---|
| 2,878,236 | 3/1959 | Young et al. | 260/78.3 |
| 2,933,478 | 4/1960 | Young et al. | 260/77.5 |
| 3,021,313 | 2/1962 | Cox et al. | 260/78.3 |
| 3,382,217 | 5/1968 | Case | 260/78.4 |
| 3,391,126 | 7/1968 | Baggett et al. | 260/78.3 |

*Primary Examiner*—Earl A. Nielsen
*Attorney, Agent, or Firm*—Sughrue, Mion, Zinn, Macpeak and Seas

[57] ABSTRACT

In a process for producing a lactone polyester which comprises ring-opening polymerization of a lactone in the presence of a metal containing organic compound as a catalyst, the improvement wherein said compound is an alcoholate, chelate or organic acid salt of vanadium or molybdenum.

14 Claims, No Drawings

PROCESS FOR PRODUCING LACTONE POLYESTERS

BACKGROUND OF THE INVENTION

1. Field of the Invention

This invention relates to a process for producing polyesters by ring-opening polymerization of lactones.

2. Description of the Prior Art

Roughly there are two types of polyesters obtained from lactones such as $\epsilon$-caprolactone. One type includes polyesters ranging in form from wax-like solids to viscous liquids which are obtained by heating lactones together with organic compounds having a reactive hydrogen atom such as glycols or aminoalcohols (organic initiators). These polyesters are useful as raw materials for the synthesis of polyurethanes or as plasticizers for vinyl resins. Usually, polyesters of this type have a molecular weight of less than several thousand (e.g., about 300 to 7,000) (see Japanese Patent Publication No. 5293/59).

The other type includes solid polymers having a higher molecular weight. Polymers having a molecular weight of more than 12,000, unlike waxy lower-molecular-weight polymers, have high strength, and can be used as structural materials such as film coatings and adhesives including hot-melt adhesives. For example, poly-$\epsilon$-caprolactone having a molecular weight of about 40,000, marketed under the trade name PCL-700 by Union Carbide Corporation, has a tensile strength of 3,000 to 4,000 psi (210 to 280 kg/cm$^2$) and an elongation of 500 to 1,000% as described in a catalogue of that company.

The present invention relates to a process for producing these polyesters by the ring-opening polymerization of lactones.

It is well known that lower molecular weight polyesters useful as plasticizers or intermediates for production of polyurethane resins can be obtained by polymerizing lactones using compounds containing at least one active hydrogen atom such as a hydroxyl or amino group hydrogen atom, for example, glycols or amines, as initiators. In the production of such lactone polyesters, various organic acids, inorganic acids, metals, and metal compounds are used as catalysts.

Typical examples of metallic catalysts are organotin compounds or organic acid tin salts, such as dibutyltin oxide or tin octylate. Inorganic catalysts such as carbonates or oxides and metallic organic catalysts such as acetates and chelate compounds are also known which are derived from many other metals such as sodium, lithium, magnesium, aluminium, etc. For example, Japanese Patent Publication No. 5294/59 (corresponding to U.S. Pat. No. 2,878,236) discloses that chelate compounds of 18 metals which partly overlap the metals exemplified above can be used as catalysts in the production of lower molecular weight polyesters. As stated in the above-cited Japanese Patent Publication, to promote the reaction sufficiently, the polymerization catalyst is used in an amount of, for example, 0.05 to 0.1%, in the prior art. However, such a relatively large amount of the catalyst cannot be allowed to remain in lactone polyesters or it will affect the process for producing polyurethane resins in which the low molecular weight lactone polyesters find their main use. Specifically, such remnant catalyst tends to shorten the gelation time and thereby being harmful for handling and to impair the hydrolysis resistance, heat resistance, etc., of the resulting polyurethane resins. For this reason, the prior art has frequently required countermeasures such as the removal of the catalyst from the lactone polyesters or the addition of a masking agent.

Japanese Patent Publication No. 5293/59 discloses titanic acid esters (e.g., butyl titanate) as a catalyst suitable for obtaining polyesters of reduced coloration within short periods of time. However, this catalyst polymerizes under the influence of moisture and becomes inactive making it difficult to handle. Moreover, duplicated experiments have shown that this catalyst also has the disadvantage of tending to color polyesters.

Thus, known catalysts have not proven to be entirely satisfactory for the preparation of lactone polyesters which are colorless and have a low acid value.

Ring-opening polymerization of lactones in the presence of the above-exemplified catalysts is usually conducted to obtain low molecular weight polyesters in the presence of initiators as described above. If, in an attempt to obtain high molecular weight polyesters (having a molecular weight of more than 12,000), lactones are heated without using initiators in the presence of known catalysts other than the organometallic compounds described below, the polymerization conversion of the lactones is low, and the resulting polymers do not have a high molecular weight. For example, it is reported that a polycaprolactone obtained using potassium carbonate as a catalyst is a hard, brittle wax-like polymer having an average molecular weight of about 4,000 (Natta et al., *J. Am. Chem. Soc.*, 56, 455, 1934). With many other catalysts, only low polymerization conversions can be obtained (see Comparative Examples hereinbelow).

Japanese Patent Publication Nos. 23917/65 (corresponding to U.S. Pat. No. 3,021,310), 26557/65 (corresponding to U.S. Pat. No. 3,021,309), 2473/68, and 14739/72 (corresponding to U.S. Pat. No. 3,632,669) disclose techniques for producing lactone polymers of high molecular weight. The average molecular weight of these polymers is from several hundred to several hundred thousand, for example, from 900 to 250,000 or more. One specific working example states that a highly crystalline fiber-forming solid polymer is obtained although its molecular weight is not specifically described. According to these references the catalysts used to obtain the lactone polymers are organometallic compounds such as phenyl magnesium bromide, butyl lithium, polyisobutyl aluminum oxide or dibutyl zinc. In these catalysts, the carbon atom of an organic radical is bonded directly to an aluminum atom or to a metal atom of Group I or Group II of the Periodic Table. These organometallic compounds have poor stability and lend themselves to difficult handling because upon contact with oxygen or moisture they immediately decompose or tend to burn. Furthermore, the amount of the catalyst used to obtain the lactone polymers is large (at least 0.3%), and the remainder of such a relatively large amount of the catalyst in the lactone polymers after the polymerization reaction tends to affect the heat resistance, etc., of the products. Thus, it has frequently been necessary to remove the remaining catalyst.

SUMMARY OF THE INVENTION

A first object of this invention is to provide a process for producing lactone polyesters using a novel catalyst which is free from the defects of the prior art. In small amounts this catalyst can bring about the completion of the reaction of polymerizing lactones and does not appreciably color the resulting polyesters. The resulting polyesters can be directly used as materials for polyurethane resins useful as elastomers, expanded resins and elastic filaments without removing the catalyst therefrom.

A second object of this invention is to provide a process for producing lactone polymers having a molecular weight of more than 12,000 without using special organometallic compounds which are difficult to handle.

DETAILED DESCRIPTION OF THE INVENTION

The first object of this invention can be achieved by selecting a catalyst from the following compounds.

(1) Alcoholates of vanadium or molybdenum having the formula:

$Mo(OR)_4$, $V(OR)_3$, $VO(OR)_3$ wherein R represents a residue resulting from the removal of OH from an alcohol. So long as an effective amount of the alcoholates as a catalyst can be dissolved in the lactone monomer, the alcohol moiety used in the present invention may be selected irrespective of whether it is saturated, unsaturated, aliphatic, alicyclic, aromatic, etc. Furthermore, the number of carbon atoms in R is not particularly limited, but typically R will contain up to 20 carbon atoms, for example, an alkyl group such as methyl, ethyl, propyl, butyl, or lauryl; benzyl, etc.

(2) Vanadium or molybdenum chelates such as a chelate of molybdenum or vanadium with acetylacetone, benzoylacetone, trifluoroacetylacetone, ethyl acetoacetate, salicylaldehyde, acetylacetoneimine or salicylaldehydeimine.

(3) Vanadium or molybdenum salts of organic acids such as salts of naphthenic acid, citric acid, oxalic acid, benzoic acid, palmitic acid, oleic acid, etc. So long as an effective amount of the salt of organic acid as a catalyst can be dissolved in the lactone monomer, the organic acids forming the vanadium or molybdenum salts may be selected irrespective of whether they are saturated, unsaturated, aliphatic, alicyclic, aromatic. The number of carbon atoms in the organic acid is not particularly limited but usually the organic acid contains up to 20 carbon atoms.

(4) Acetylacetonates of zinc or titanium such as zinc bisacetylacetonate $Zn(C_5H_7O_2)_2$, titanium diisopropoxybisacetylacetonate $Ti(C_5H_7O_2)_2(OC_3H_7)_2$, bisacetylacetonatotitanium oxide $TiO(C_5H_7O_2)_2$, titanium trisacetylacetonate $Ti(C_5H_7O_2)_3$, bisacetylacetonatotitanium dichloride $TiCl_2(C_5H_7O_2)_2$, and bis(trisacetylacetonatotitanium) $(C_5H_7O_2)_3Ti.Ti(C_5H_7O_2)_3$.

The prior art does not teach the use of vanadium and molybdenum compounds such as shown in (1) to (3) above as inorganic compound catalysts or metallic organic compound catalysts in lactone polymerizations. Japanese Patent Publication Nos. 5293/59 and 5294/59 (corresponding to U.S. Pat. Nos. 2,933,478 and 2,878,236) disclose compounds of 19 and 18 metals respectively, however, those metals mainly fall within Groups I to IV of the Periodic Table and the iron-group ("iron-group" is used as a generic name for Group VIII of the Periodic Table including iron, cobalt and nickel). In view of the results obtained with the wide range of compounds studied in these references, it is unexpected that compounds of metals of Groups Va and VIa of the Periodic Table such as vanadium and molybdenum are effective catalysts.

The zinc and titanium compounds exemplified above are among the chelate compound catalysts disclosed in the prior art (e.g., Japanese Patent Publication No. 5294/59, i.e., U.S. Pat. No. 2,878,236). While glycol chelates or alkanolamine chelates as well as other chelate compounds such as keto alcohols, keto-acids and lactic acid (hydroxy acid) have been known as especially effective chelate compound catalysts, no specific disclosure is made in the art about polymerizing lactones using metal acetylacetonate compounds as catalysts. Naturally, the prior patent neither describes nor suggests that the zinc or titanium acetylacetonate compounds used in the present invention have polymerization activity when used even in small amounts and can give lactone polyesters having superior color hue and a superior pot life.

When lactones are polymerized in the presence of these specific catalysts in accordance with this invention, a compound having active hydrogen is used in the reaction system as an initiator to obtain low molecular weight polyesters which are useful for preparation of polyurethane. It is the usual practice to perform the reaction after adding the organic initiator, typically an organic compound having two hydroxyl or amino groups, in an amount corresponding to the molecular weight desired. Generally speaking, the ratio of initiator to monomer is directly proportional to the ratio of the molecular weight of the initiator to the molecular weight of the polymer minus the molecular weight of the initiator, as follows.

$$A/B = C/D - C$$

A: amount of the initiator (wt.)
B: amount of lactone monomer (wt.)
C: molecular weight of the initiator
D: desired molecular weight of the polymer However, when high molecular weight lactone polymers are desired, no organic initiator is added as a trace of moisture present as an impurity acts as an initiator, as will be described hereinbelow.

The second object of this invention can be achieved by ring-opening polymerization of lactones having a moisture content of about 0.15% or less in the presence of an organic molybdenum compound as a catalyst without an initiator.

The organic molybdenum compound used in this process is selected from the molybdenum compounds described above in (1) to (3). The compounds in groups (1) and (2) are preferred because they are readily available and have superior stability.

When a lactone monomer having a moisture content of about 0.15% is heated in the presence of such a molybdenum-containing catalyst, ring-opening polymerization takes place rapidly without the addition of an organic initiator to give a lactone polymer of a high molecular weight at a high conversion. This catalyst has good stability, is easy to handle, and can bring about completion of the reaction even when used in small amounts. The polyester obtained is substantially uncolored, and in most cases, it is not necessary to remove the catalyst from the resulting polymer. Among the many metallic and nonmetallic compounds studied, these molybdenum compounds are particularly suitable for obtaining high molecular weight lactone polymers.

Generally, the catalyst is used in an amount of 0.0001 to 0.5% by weight based on the weight of the lactone and preferably about 0.0005 to 0.01% by weight (5 to 100 ppm). Even in a lower concentration (e.g., about 10 ppm) normally used in this reaction, the catalyst can bring about the completion of the reaction within a relatively short period of time.

The lactones used in this invention are lactones having at least 5, preferably at least 6, and up to 12 carbon atoms in the ring which may optionally be substituted with an alkyl group, or mixtures of lactones. Specific examples of the lactones include δ-valerolactone (VL), β-ethyl-δ-valerolactone, ε-caprolactone (CL), α-methyl-ε-caprolactone (MCL), β-methyl-ε-caprolactone, γ-methyl-ε-caprolactone, β,δ-dimethyl-ε-caprolactone (DMCL), 3,3,5-trimethyl-ε-caprolactone (TMCL), enantholactone (7-heptanolide), and dodecanolactone (12-dodecanolide, DL).

As polymerization initiators that may be used, compounds having at least one active hydrogen are suitable. Specific examples of such polymerization initiators include alcohols, for example, aliphatic or aromatic diols such as ethylene glycol (EG), 1,4-butanediol (1,4-BG), diethylene glycol (DEG), 1,6-hexanediol (1,6-HD) and bis(hydroxymethyl)benzene (BHB), and amines, for example, aliphatic or aromatic diamines such as ethylenediamine (EDA) and phenylenediamine.

The reaction temperature is, for example, at least 50° C. as is generally used in this type of reaction, and preferably 100° to 200° C. The reaction is performed in an atmosphere of nitrogen to afford a colorless lactone polyester. The reaction time may vary depending upon the type of the lactone and the polymerization initiator, their mixing ratio, the concentration of the catalyst, the reaction temperature, etc. Usually, when the reaction is carried out for 1 to 24 hours, a lactone conversion of at least 99.5% can be obtained.

The polymerization reaction may be performed in bulk in an atmosphere of an inert gas such as nitrogen, or it may be carried out in the presence of an inert, normally liquid organic solvent. Examples of such a solvent include aromatic hydrocarbons such as toluene and xylene, chlorinated hydrocarbons such as chloroform and trichloroethylene, and ethers such as tetrahydrofuran (THF). Solvent is used in an amount of 1 to 10 times (vol.) the lactone monomer.

In the polymerization of lactones, an active hydrogen compound (e.g., —OH, —NH, etc.) in the feed stock acts as a polymerization initiator, and its amount greatly affects the molecular weight of the resulting polymer. To obtain a low molecular weight polymer having a molecular weight of several thousand, it is the usual practice to add an organic initiator to achieve the desired molecular weight and also to obtain a sufficient rate of polymerization. The lactone polyesters usually obtained in this case have an average molecular weight of 300 to 12,000, and an acid value of 1 or less. Such polyesters are useful as materials for the synthesis of polyurethanes. The acid value of polyesters obtained using a conventional metal chelate catalyst are often too high (e.g., 1.7 to 4.1) for the production of polyurethane as is seen at page 9 of Japanese Patent Publication No. 5294/59 (corresponding to Column 13 of U.S. Pat. No. 2,878,236). High acid values shorten pot life and adversely affect hydrolysis resistance in the production of polyurethane. When the acid value of the lactone polyesters is 1 (mg KOH/g) or less, these disadvantages do not occur.

On the other hand, in order to obtain high molecular weight polyesters by the ring-opening polymerization of lactones, an organic initiator should not be used, and the moisture content of lactones and a solvent (if used) must be restricted. To obtain polymers having a molecular weight of more than 12,000, the moisture content of lactones should be adjusted to 0.15% or less. To obtain polymers with higher molecular weights, lactones of lower moisture content or substantially anhydrous lactones must be used. The carbon compounds of molybdenum induce the ring-opening polymerization of lactones at a sufficiently high rate even when there is only a small amount of water which acts as an initiator, thus affording polymers having a molecular weight of 50,000 to several hundred thousand. Higher molecular weights are preferred because they lead to improved mechanical properties such as tensile strength. These high molecular weight polymers retain sufficient strength at a temperature of up to about 60° C., and abruptly soften at about 60° C.

The processes of this invention can be performed batchwise, semicontinuously or continuously. The reaction vessel used may be any of those which are generally employed in polymer production such as a glass vessel or a steel kneader. There is no restriction on the sequence of adding the catalyst and the lactone. However, it is usually best to add the catalyst to the reaction system which contains the lactone and optionally an inert organic solvent.

Thus, according to this invention, a polyester which is not adversely affected by the catalyst or acid component can be prepared by polymerizing the lactone in the presence of a small amount (e.g., 10 ppm) of the catalyst for a relatively short period of time.

By using the vanadium or molybdenum catalysts in accordance with this invention, polyesters can be produced even from those lactones which are difficult to polymerize by prior techniques such as 3,3,5-trimethyl-ε-caprolactone. Since the catalyst of this invention is highly active even in a low concentration and gives a high conversion of lactone, the removal of remaining monomer or catalyst is unnecessary, and the coloration of the resulting polyester can be markedly reduced.

According to this invention, lactone polymers having a high molecular weight and a high strength can be obtained without using organometallic compounds which are difficult to handle.

The following Examples and Comparative Examples illustrate the present invention in greater detail.

EXAMPLE 1

To 913.12 g of ε-caprolactone and 30.06 g of ethylene glycol as a reaction initiator was added 5 ppm, based on the ε-caprolactone, of molybdenum (IV) n-propylate as a catalyst. In a stream of nitrogen, the reaction was performed at 170° C. The conversion of the ε-caprolactone was checked every 30 minutes and the reaction was continued until the conversion of ε-caprolactone reached at least 99.5%. The time required for the reaction was 3 hours. The resulting polyester was a white wax-like solid at room temperature, and had a hydroxyl value of 56.05, an acid value of 0.15, and a Hazen index (APHA) in the molten state of 20.

This polyester was subjected to a urethanization reaction. The heat generated was less than in the case of using the polyester obtained in Comparative Example 1 given hereinbelow. The maximum temperature reached was 92° C., and gelation required a time of 6 minutes resulting polyesters were colored to a far larger degree than those obtained in the present invention.

TABLE 1

| Example No. | Catalyst | Concentration of Catalyst (ppm) | Reaction Temperature, Reaction Time | Lactone | Initiator | Hydroxyl Value | Acid Value | Hazen Index (APHA) |
|---|---|---|---|---|---|---|---|---|
| 2 | Molybdenum (IV) n-butylate | 5 | 170° C. 3 hrs | CL 455.42 g | 1.4-BG 46.35 g | 112.11 | 0.11 | 20 |
| 3 | Vanadium (III) n-butylate | 10 | 170° C. 5 hrs | CL 445.74 g | 1.6-HD 55.62 g | 112.56 | 0.11 | 20 |
| 4 | Vanadyl (V) n-butylate | 10 | 170° C. 5 hrs | CL 470.00 g | EDA 30.90 g | 112.88 | 00.0 | 50 |
| 5 | Molydbenum (VI) acetylacetonate | 2.5 | 170° C. 5 hrs | CL 778.85 g | DEG 21.84 g | 28.10 | 0.10 | 20 |
| 6 | Vanadium (III) acetylacetonate | 20 | 160° C. 5 hrs | CL 455.42 g | 1.4-BG 46.35 g | 112.26 | 0.20 | 20 |
| 7 | Molybdenum naphthenate | 2.5 | 180° C. 3 hrs | CL 351.00 g | BHB 71.07 g | 133.46 | 0.19 | 20 |
| 8 | Vanadium naphthenate | 10 | 190° C. 3 hrs | CL 434.00 g | DEG 109.18 g | 207.88 | 0.12 | 30 |
| 9 | Molybdenum citrate | 10 | 170° C. 2 hrs | CL 238.00 g | EG 63.86 g | 374.01 | 0.17 | 20 |
| 10 | Molybdenum hexacarbonyl | 10 | 170° C. 2 hrs | CL 456.56 g | EG 15.03 g | 55.72 | 0.10 | 20 |
| 11 | Molybdenum (IV) n-butylate | 50 | 170° C. 10 hrs | TMCL 594.00 g | EG 31.93 g | 90.12 | 0.46 | 40 |
| 12 | Molybdenum naphthenate | 20 | 170° C. 4 hrs | DL 469.00 g | EG 31.93 g | 112.35 | 0.35 | 30 |
| Comparative Example 2 | Dibutyltin oxide | 100 | 170° C. 7 hrs | CL 456.56 g | EG 15.03 g | 56.24 | 0.32 | 80 |
| Comparative Example 3 | Tin octylate | 100 | 170° C. 7 hrs | CL 456.56 g | EG 15.03 g | 55.93 | 0.21 | 60 | which is suitably workable.

When the polyester of Comparative Example 1 was used, the maximum temperature reached in the urethanization reaction was 110° C., and the gelation time was as short as 2 minutes.

COMPARATIVE EXAMPLE 1

To 456.56 g of $\epsilon$-caprolactone and 15.03 g of ethylene glycol as a reaction initiator was added 10 ppm based on the $\epsilon$-caprolactone of tetrabutyl titanate (TBT) as a catalyst, and the reaction was performed at 170° C. in a stream of nitrogen.

In the same way as in Example 1, the reaction was continued until the conversion of $\epsilon$-caprolactone reached at least 99.5%. The time required for the reaction was 5 hours. The resulting polyester was a white wax-like solid at room temperature, and had a hydroxyl value of 56.10, an acid value of 0.52, and a Hazen index (APHA) in the molten state of 100.

EXAMPLES 2-12

Lactones were polymerized using the various carbon compounds of molybdenum or vanadium shown in Table 1. The time periods required for the polymerization and the properties of the resulting polyesters determined in the same way as in Example 1 are also shown in Table 1. Abbreviations for the lactones and the initiators are the same as those given hereinabove.

COMPARATIVE EXAMPLES 2 & 3

When known tin compound catalysts were used in an amount of as large as 100 ppm, a period of 7 hours was required to obtain a conversion of 99.5% at 170° C. The

EXAMPLE 13

To 913.12 g of $\epsilon$-caprolactone and 30.06 g of ethylene glycol as a reaction initiator was added 10 ppm based on the $\epsilon$-caprolactone of zinc bisacetylacetonate as a catalyst, and the reaction was carried out at 190° C. in a stream of nitrogen. The reaction was continued until the conversion of $\epsilon$-caprolactone determined in the same way as in Example 1 reached at least 99.5%. The time required for the reaction was 4 hours. The resulting polyester was a white wax-like solid at room temperature, and had a hydroxyl value of 56.25, an acid value of 0.14, and a Hazen index (APHA) in the molten state of 20.

When this polyester was subjected to a urethanization reaction, the heat generated was less than in the case of using the polyester obtained in Comparative Example 1. The maximum temperature reached was 92° C., and gelation required a period of 6 minutes which is suitable for workability.

Thus, in the present invention, the polyester is not colored even at a relatively high reaction temperature of 190° C., and the heat generated in the urethanization reaction is small. Moreover, the gelation time is long, and the workability is good.

EXAMPLES 14-21

Lactones were polymerized using the various acetylacetonate compounds of zinc or titanium shown in Table 2.

The time required for the reaction and the properties of the polyesters determined in the same way as in Example 1 are also shown in Table 2. Abbreviations for the lactones and initiators are the same as those given hereinabove.

TABLE 2

| Example No. | Catalyst | Concentration of Catalyst (ppm) | Reaction Temperature, Reaction Time | Lactone | Initiator | Hydroxyl Value | Acid Value | Hazen Index (APHA) |
|---|---|---|---|---|---|---|---|---|
| 14 | Bisacetylacetonato-titanium oxide | 10 | 170° C., 4 hrs | CL 456.56 g | EG 15.03 g | 56.42 | 0.20 | 20 |
| 15 | Zinc bisacetylacetonate | 50 | 170° C., 5 hrs | CL 455.42 g | 1.4-BG 46.35 g | 112.26 | 0.16 | 20 |
| 16 | Bis(trisacetylacetonato-titanium) | 5 | 170° C., 4 hrs | CL 455.74 g | 1.6-HD 55.62 g | 112.41 | 0.19 | 20 |
| 17 | Bisacetylacetonato-titanium chloride | 10 | 170° C., 5 hrs | CL 778.85 g | DEG 21.84 g | 28.05 | 0.18 | 20 |
| 18 | Bis(trisacetylacetonato-titanium) | 5 | 170° C., 5 hrs | MCL 381.95 g | 1.4-BG 18.00 g | 56.10 | 0.27 | 30 |
| 19 | Bisacetylacetonato-titanium oxide | 20 | 170° C., 7 hrs | DMCL 389.36 g | DEG 10.6 g | 28.21 | 0.46 | 50 |
| 20 | Bisacetylacetonato-titanium dichloride | 20 | 170° C., 6 hrs | DL 469.00 g | EG 31.93 g | 112.10 | 0.42 | 40 |
| 21 | Zinc bisacetylacetonate | 50 | 170° C., 5 hrs | VL 193.8 g | EG 6.2 g | 56.05 | 0.16 | 20 |

EXAMPLE 22

100 parts of distilled ε-caprolactone having a moisture content of 0.015% was charged into a reactor equipped with a stirrer and a nitrogen gas inlet tube, and heated to 110° C. Then, as a catalyst, 0.001 part of molybdenum (VI) acetylacetonate was added. The mixture was stirred for 3 hours to afford a crystalline polyester in a yield of 99.5%. The resulting polyester was white and rigid and had a molecular weight (number average molecular weight determined from GPC) of 64,000. The polymer had a tensile strength of 499 kg/cm$^2$ and an elongation of 849%.

EXAMPLE 23

The procedure of Example 22 was repeated except that 0.001 part of molybdenum (IV) n-butylate was used as the catalyst, and the mixture of the lactone and the catalyst was stirred for 5 hours. A crystalline polyester was obtained in a yield of 99.5%. The resulting polyester was white and rigid, and had a molecular weight of 61,000. The polymer had a tensile strength of 488 kg/cm$^2$ and an elongation of 835%.

EXAMPLE 24

The procedure of Example 22 was repeated except that ε-caprolactone having a moisture content of 0.007% was used and the mixture of the lactone and the catalyst was stirred for 5 hours. A white rigid polyester was obtained in a yield of 99.8%. The polymer had a molecular weight of 103,000, a tensile strength of 575 kg/cm$^2$, and an elongation of 882%.

COMPARATIVE EXAMPLE 4

ε-caprolactone was polymerized in the same way as in Example 1 except that 0.005 part of vanadium (II) acetylacetonate was used as the catalyst. Even when the mixture of the materials was stirred for 10 hours, a high conversion was not obtained and a crystalline polyester could not be obtained.

EXAMPLES 25–28 AND COMPARATIVE EXAMPLES 5–9

50 g of ε-caprolactone having a moisture content of 0.015% was taken into a glass ampoule, and each of the various catalysts shown in Table 3 was added. The inside of the glass ampoule was purged with nitrogen, and then the ampoule was sealed. The ampoule was then placed stationarily in a Geer oven for polymerization of the ε-caprolactone under the conditions shown in Table 3. The results are shown in Table 3. When molybdenum (VI) acetylacetonate was used as the catalyst, high molecular weight polymers were obtained with an increased viscosity. However, when other catalysts including tetrabutyl titanate and tin octylate which are normally used for the polymerization of ε-caprolactone in the presence of organic initiators were used, no rise in viscosity was noted.

TABLE 3

| Example No. | Catalyst | Amount (ppm) | Temperature (°C.) | Time (hr) | Appearance of the Product |
|---|---|---|---|---|---|
| Example 25 | MoO$_2$(C$_5$H$_7$O$_2$)$_2$ | 50 | 140 | 16 | Viscosity increased |
| Example 26 | " | " | 170 | 44 | Viscosity increased |
| Example 27 | " | " | 110 | " | Viscosity increased |
| Example 28 | " | 10 | 170 | " | Viscosity increased |
| Comparative Example 5 | Ti(OC$_4$H$_9$)$_4$ | 50 | 140 | 16 | No change in viscosity, colored |
| Comparative Example 6 | Ti(C$_5$H$_7$O$_2$)$_4$ | " | " | " | No change in viscosity, colored |
| Comparative Example 7 | Sn(OCOC$_7$H$_{15}$)$_2$ | " | " | " | No change in viscosity |
| Comparative Example 8 | (C$_4$H$_9$)$_2$SnO | " | " | " | No change in viscosity |
| Comparative Example 9 | V(C$_5$H$_7$O$_2$)$_3$ | " | " | " | No change in viscosity |

While the invention has been described in detail and with reference to specific embodiments thereof, it will be apparent to one skilled in the art that various changes and modifications can be made therein without departing from the spirit and scope thereof.

What is claimed is:

1. In a process for producing a lactone polyester which comprises ring-opening polymerization of a lactone in the presence of a metal containing organic compound as a catalyst, the improvement wherein said catalyst is an alcoholate, chelate or organic carboxylic acid salt of vanadium or molybdenum.

2. The process of claim 1, wherein said catalyst is an alcoholate of vanadium or molybdenum.

3. The process of claim 1, wherein said catalyst is a chelate of vanadium or molybdenum.

4. The process of claim 1, wherein said catalyst is an organic carboxylic acid salt of vanadium or molybdenum.

5. The process of claims 1 or 2, wherein said alcoholate is of the formula $$Mo(OR)_4, V(OR)_3, VO(OR)_3$$

wherein R represents a residue resulting upon the removal of the hydroxyl group from an alcohol.

6. The process of claims 1 or 3, wherein said chelate is a chelate with acetylacetone, benzoylacetone, trifluoroacetylacetone, ethyl acetoacetate, salicylaldehyde, acetylacetoneimine or salicylaldehydeimine as a ligand.

7. The process of claims 1 or 4, wherein said organic acid salt is an organic acid salt of naphthenic acid, citric acid, oxalic acid or benzoic acid.

8. The process of claim 1, wherein said polymerization is carried out in the presence of a polymerization initiator having at least one active hydrogen atom.

9. The process of claim 1, wherein said catalyst is an organic molybdenum compound.

10. The process of claim 9, wherein said polymerization is carried out in the absence of a polymerization initiator and said lactone has a moisture content of 0.15% or less.

11. In a process for producing a lactone polyester which comprises ring-opening polymerization of a lactone in the presence of a metal containing organic compound as a catalyst and a polymerization initiator, the improvement which comprises said catalyst being a zinc acetylacetonate.

12. The process of claim 11, wherein said catalyst is zinc bisacetylacetonate $Zn(C_5H_7O_2)_2$.

13. The process of claim 1, wherein said lactone has at least 5 carbon atoms.

14. The process of claim 13, wherein said lactone is ε-caprolactone.

* * * * *